UNITED STATES PATENT OFFICE 2,524,547

FUNGICIDAL MERCURY COMPOUNDS AND METHODS OF MAKING SAME

Frank J. Sowa, Cranford, N. J.

No Drawing. Application June 28, 1947, Serial No. 757,953

12 Claims. (Cl. 260—434)

This application relates to fungicidal compounds and methods of producing the same and is a continuation-in-part of my copending application Serial No. 500,449, filed August 28, 1943, now issued as Patent No. 2,423,262 dated July 1, 1947.

In accordance with the foregoing application, new water soluble fungicidal compounds are produced by reactions between aromatic and heterocyclic mercury compounds and alkylolamines. These compounds I believe to be addition products wherein a mercury group and an anion are bonded to the nitrogen atom of the amine by the latent valences of the atom so that a quaternary ammonium type of compound is produced.

Further, in accordance with the foregoing application, it is pointed out that when the amine employed in producing the compound is itself water soluble and also is hydroxylated the resulting reaction products are water soluble.

The present invention relates to amine addition compounds produced by reaction between amines and aromatic or heterocyclic mercury compounds wherein the amine employed is not hydroxylated and does not contain any hydroxylated substituents. A surprising characteristic of these new reaction products resides in the fact that the addition of the mercury containing group to the amine serves in many instances to result in the formation of compounds which are more soluble in water than the amine itself. The compounds are generally also soluble in alcohol, hydrocarbons and organic solvents.

One of the objects of my invention is to provide novel mercury containing fungicidal compounds of a quaternary ammonium type.

Another object of my invention is to provide novel methods for producing fungicidal compounds.

A particular object of my invention is to provide new fungicidal compounds by reaction between organic mercury compounds and amines which contain no hydroxylated substituents.

These and other objects and features of my invention will appear from the following description thereof.

The organic mercury compounds employed in the practice of the present invention have the general formula R—Hg—X in which R is an aromatic or heterocyclic group and X is an anion. These compounds differ markedly from the aliphatic and alicyclic mercury compounds and from inorganic mercury compounds in that they are themselves generally less corrosive to the skin and easier to employ and they result in the formation of reaction products which possess much greater fungicidal effect and are not so injurious to plant and animal life. Moreover, many inorganic compounds cannot be used to produce stable or satisfactory reaction products with amines. Furthermore, when it is desired to produce reaction products which are most soluble in water and common solvents the anion of the R—Hg—X compound should be an organic acid radical or a hydroxyl group.

Typical aromatic compounds which may be used in the practice of my invention are phenyl mercury acetate, phenyl mercury hydroxide, phenyl mercury lactate, tolyl mercury acetate and naphthyl mercury acetate. Among the heterocyclic mercury compounds which may be used are pyridyl mercury acetate, 2 methyl 5 acetoxymercuri-furan, and 2 methyl 5 acetoxymercurithiophene. However, these compounds are only cited as typical of those which may be employed, since I believe the reaction to be generic in that all compounds having the general formula R—Hg—X as defined above appear to be capable of use in accordance with my invention.

The amines employed in the practice of the present invention are primary amines which contain no hydroxylated substituents. Typical aliphatic amines which may be used are those containing from 1 to 18 carbon atoms such as ethyl amine, butyl amine, normal octyl amine, lauryl amine, decyl amine, cetyl amine and stearylamine. Among the alicyclic amines which can be employed are cyclohexylamine and ortho amino dicyclohexyl. Aralkyl amines such as benzyl amine and unsaturated alkyl amines such as oleyl amine and octadecenylamine may also be used. However, numerous other amines may be employed since it appears that the reaction is generic in character and may be carried out when using any primary amine.

The reaction by which the new addition products are produced may be expressed by the following empirical equation

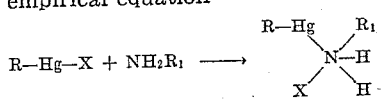

wherein R is an aromatic or heterocyclic group, X is an anion, and R₁ is an hydrocarbon radical.

Products of such reactions wherein the amine employed is an aliphatic amine containing from 6 to 18 carbon atoms possess the properties of a wetting agent and those containing 8 or more carbon atoms also have detergent properties. A striking characteristic of those reaction products wherein long chain aliphatic amines are used resides in the fact that the addition of the organic mercury group to the amine serves in most instances to result in increased water solubility. Thus for example lauryl amine, which is substantially insoluble in water may be combined with phenyl mercury acetate and similar compounds to produce reaction products which are readily soluble in water. The reaction products of the present invention are generally also soluble in ethanol, hydrocarbons and organic solvents. They are further characterized by their fungicidal action which renders them particularly suitable for use in sprays, for agricultural and other purposes, and in soaps, paints, coating compositions, plastics and for many other purposes wherein the fungicidal properties of the compound are desired or necessary.

The reaction by which the new fungicidal compounds are produced are preferably conducted at ordinary room temperatures and pressures, although the reaction mixture may be heated if desired and in many instances the reaction is exothermic producing a spontaneous rise in temperature as the reaction proceeds. The reaction is usually carried out in the presence of an organic solvent such as ethanol and may be conducted by simply dissolving the reactants in ethanol or by otherwise mixing the organic mercury compound with the amine in the presence of an organic solvent. The temperature of the reaction is preferably maintained below the boiling point of the solvent employed.

In order to indicate the nature of my invention more fully and to illustrate typical procedure and products to which my invention relates, the following examples are cited:

Example 1

67.3 grams of phenyl mercury acetate were added to 100 cc. of ethanol and 13.0 grams of isopropyl amine were added to the mixture. The reaction was exothermic and solution of the phenyl mercury acetate was complete in about 10 minutes. On crystallization of the product from acetone a white crystalline product was obtained which melted at about 218° C. with slight decomposition. This product is soluble in ethanol, acetone, water, benzene and ethyl acetate, and is only slightly soluble in hot cyclohexane and hot Stoddard solvent. This product has the probable formula

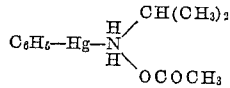

Example 2

101 grams of phenyl mercury acetate and 42.6 grams of normal octyl amine were added to 200 cc. of ethanol. Complete solution was effected and the solution got slightly warm. The reactant solution was evaporated yielding a heavy viscous, dark red oil which is soluble in water, ethanol, benzene, and ethyl acetate and slightly soluble in hot Stoddard solvent and hot cyclohexane. This product has the probable formula

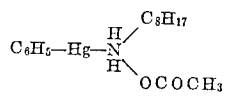

Example 3

67.3 grams of phenyl mercury acetate were added to 150 cc. of ethanol and after thorough mixing 38 grams of lauryl amine was rapidly added. A rapid reaction took place and all of the phenyl mercury acetate went into solution within about an hour. The resulting solution was evaporated leaving a thick viscous oil with a reddish brown color which is soluble in ethanol, water benzene, ethyl acetate, cyclohexane and warm Stoddard solvent. This product has the probable formula.

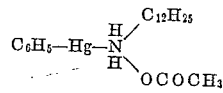

Example 4

134.7 grams (0.4 mole) of phenyl mercury acetate are stirred thoroughly with 300 cc. of ethanol. To this mixture was rapidly added 43.5 grams (0.44 mole) of cyclohexylamine. The mixture is stirred and it is noted that the undissolved phenyl mercury acetate enters into solution while the temperature of the solution rises. The reaction is completed in approximately five minutes. The reaction mixture is concentrated and the resulting white crystalline product is washed with cyclohexane. The melting point of the product is between 164° and 166° C. It is soluble in water, ethanol, ethyl acetate, benzene and is slightly soluble in hot Stoddard solvent and hot cyclohexane. This product has the probable formula

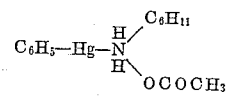

Example 5

67.3 grams of phenyl mercury acetate were added to 200 cc. of ethanol and 37.2 grams of o-amino-dicyclohexyl were rapidly added. The reaction was exothermic and solution was substantially complete after stirring for one hour. The solvent was evaporated leaving a viscous red oil which solidified upon standing. This material is soluble in ethanol, acetone, benzene, ethyl acetate and Stoddard solvent, and is slightly soluble in hot water. This product has the probable formula

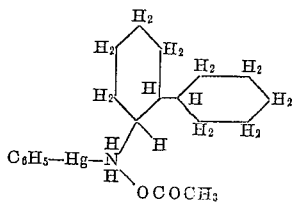

Example 6

67.3 grams of phenyl mercury acetate were added to 100 cc. of ethanol and after thorough mixing 22.4 grams of benzyl amine were rapidly added. Reaction took place with the evolution of heat, and complete solution of the mercury compound was effected in one-half hour. The solution became pale yellow and when evaporated yielded a heavy viscous oil which solidified on standing a few days. The material is soluble in ethanol, benzene, acetone and ethyl acetate, and is slightly soluble in water, hot cyclohexane and hot Stoddard solvent. In order to purify this product it was dissolved in acetone to which water was added until the solution became cloudy and a crystalline product was formed. The solution was filtered and the dried product was found to have a melting point of from 113 to 115° C. This product has the probable formula

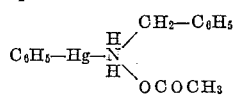

Solutions wherein the reaction products of the present invention are dissolved in water or organic solvents may be employed as fungicidal sprays for agricultural purposes, for the treatment of textile fabrics, and for other uses, and the reaction products may be added to paints, lacquers, varnishes and other coating compositions which embody an organic solvent. They also may be employed as constituents of molded or plastic compositions or filaments or sheets of plastic material.

While I have indicated preferred procedure for use in producing products of my invention and have cited numerous examples of these new fungicidal compounds, it will be apparent that many other methods and compositions may be produced and used in accordance with my invention. Therefore, it should be understood that the methods and examples particularly described above are intended to be illustrative only and are not intended to limit the scope of my invention.

I claim:

1. A fungicidal compound having the composition represented by the formula

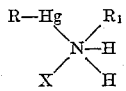

wherein R is an aryl hydrocarbon radical, X is an anion, and $R_1$ is a hydrocarbon radical selected from the class consisting of alkyl, cycloalkyl and aralkyl radicals.

2. A fungicidal compound having the composition represented by the formula

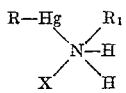

wherein R is an aryl hydrocarbon radical, X is an anion, and $R_1$ is an aliphatic hydrocarbon radical.

3. A fungicidal compound having the composition represented by the formula

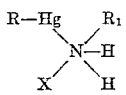

wherein R is an aryl hydrocarbon radical, X is an anion, and $R_1$ is an alicyclic hydrocarbon radical.

4. A fungicidal compound having the composition represented by the formula

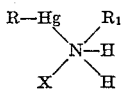

wherein R is an aryl hydrocarbon radical, X is an anion, and $R_1$ is an aralkyl hydrocarbon radical.

5. A fungicidal compound having the composition represented by the formula

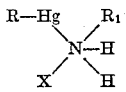

wherein R is an aryl hydrocarbon radical, X is an anion, and $R_1$ is an aliphatic hydrocarbon radical containing at least 6 carbon atoms, said product having the properties of a wetting agent.

6. A fungicidal compound having the composition represented by the formula

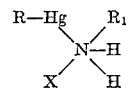

wherein R is an aryl hydrocarbon radical, X is an anion, and $R_1$ is an aliphatic hydrocarbon radical containing from 8 to 18 carbon atoms, said product having detergent properties.

7. A new fungicidal product having the composition represented by the formula

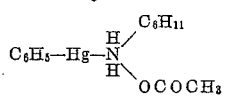

and having a melting point of about 164° C.

8. A new fungicidal product having the composition represented by the formula

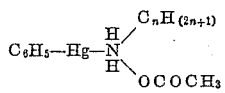

where $n$ is a number at least as great as 6, said product having the properties of a wetting agent.

9. A new fungicidal product having the composition represented by the formula

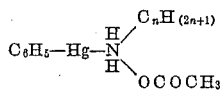

where $n$ is a number from 8 to 18, said product having detergent properties.

10. The method of producing fungicidal products which comprises the step of mixing an organic mercury compound having the formula R—Hg—X, where R is an aryl hydrocarbon radical and X is an anion, with a primary amine having the composition $NH_2R_1$ where $R_1$ is a hydrocarbon radical, in the presence of a solvent and at a temperature below the boiling point of the solvent.

11. The method of producing a fungicidal product having the properties of a wetting agent which comprises the steps of mixing a compound having the formula R—Hg—X, where R is an aryl hydrocarbon radical, and X is an anion, with an aliphatic primary amine containing at least 6 carbon atoms, in the present of a solvent and at a temperature below the boiling point of the solvent.

12. The method of producing a fungicidal product having detergent properties which comprises the step of mixing phenyl mercury acetate with an aliphatic primary amine containing from 8 to 18 carbon atoms, in the presence of a solvent and at a temperature below the boiling point of the solvent.

FRANK J. SOWA.

REFERENCES CITED

The following references are of record in the file of this patent:

UNITED STATES PATENTS

| Number | Name | Date |
|---|---|---|
| 1,060,327 | Engelmann | Apr. 29, 1913 |
| 1,919,732 | Kharasch | July 28, 1933 |
| 2,104,316 | Booer | Jan. 4, 1938 |
| 2,241,829 | Six et al. | May 13, 1941 |
| 2,277,180 | Wolff et al. | Mar. 24, 1942 |
| 2,423,121 | Sowa | July 1, 1947 |
| 2,423,262 | Sowa | July 1, 1947 |